June 30, 1931. W. TEALE ET AL 1,812,728
FLUID PROPORTIONING DEVICE
Filed Sept. 25, 1928    2 Sheets-Sheet 1
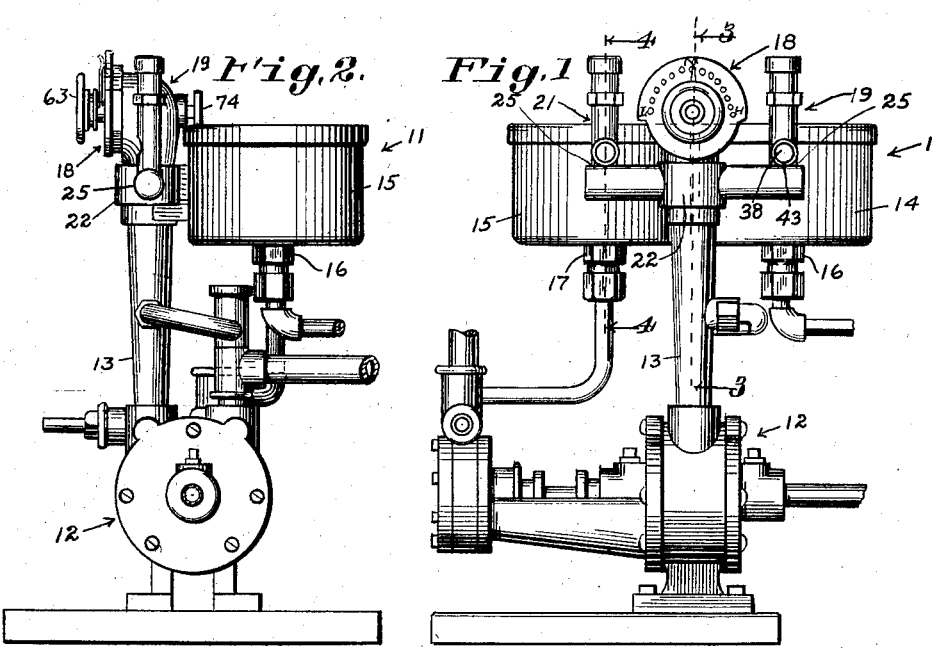
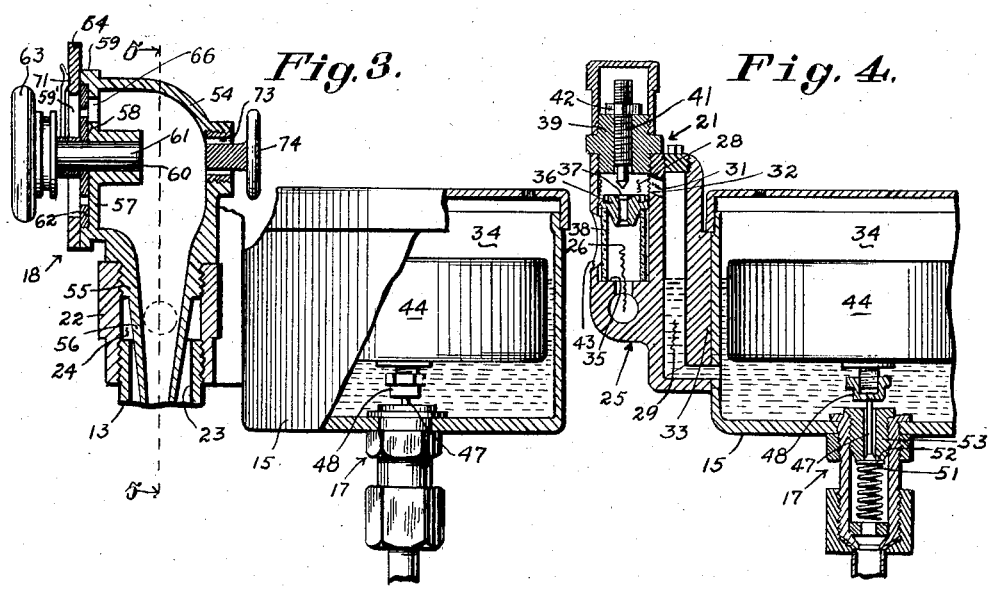
INVENTORS
Wilbur Teale
Herbert F. McLauthlin
BY M. C. Frank
ATTORNEY June 30, 1931.  W. TEALE ET AL  1,812,728
FLUID PROPORTIONING DEVICE
Filed Sept. 25, 1928  2 Sheets-Sheet 2
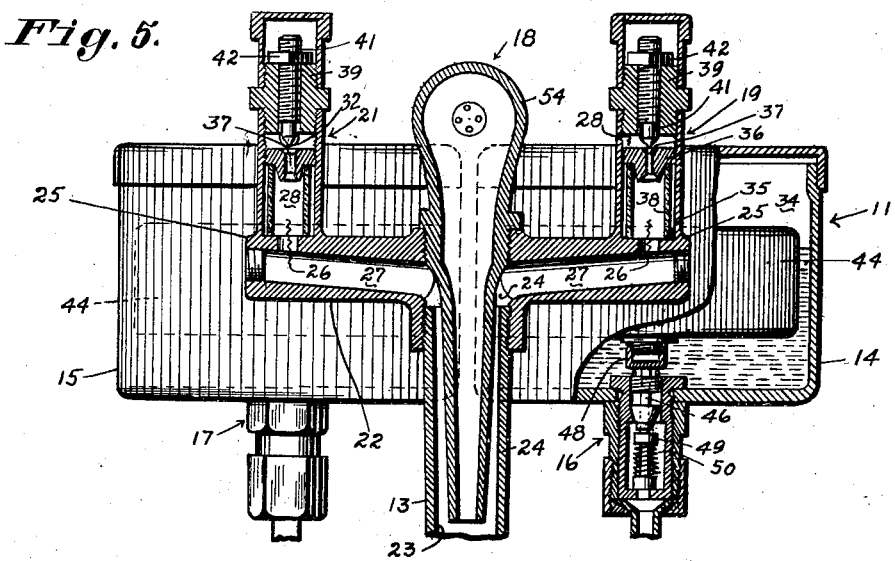
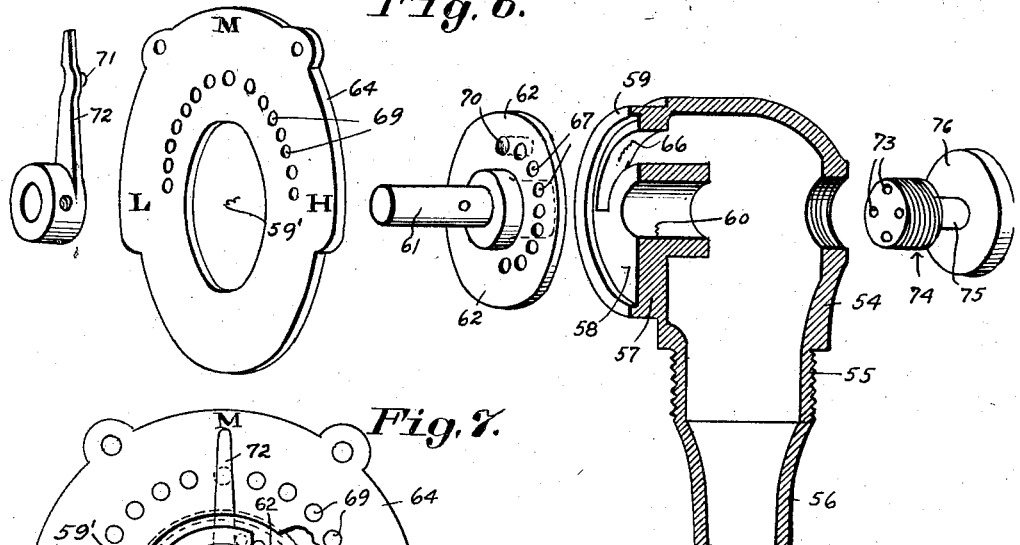
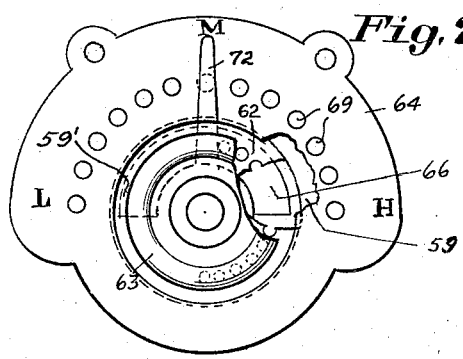
Inventors
Wilbur Teale
Herbert F. McLauthlin
By M. C. Frank
Attorney Patented June 30, 1931

1,812,728

UNITED STATES PATENT OFFICE

WILBUR TEALE AND HERBERT F. McLAUTHLIN, OF OAKLAND, CALIFORNIA, ASSIGNORS TO HYDRO-OIL FIRE CORPORATION, OF TACOMA, WASHINGTON, A CORPORATION OF WASHINGTON

FLUID PROPORTIONING DEVICE

Application filed September 25, 1928. Serial No. 308,309.

The invention relates to a device for controllably proportioning fluids intended to be intermixed, said device being particularly designed for, though not limited to, use with apparatus for compounding a fuel such as that described in our application for patent on hydro-oil burners, Serial Number 82,191, filed January 19, 1926, and claimed in our application for patent on a fluid fuel, Serial Number 308,306 filed September 25, 1928.

An object of the invention is to provide a device of the class described which is operated by suction.

Another object of the invention is to provide a device of the class described in which the required proportioning is automatically maintained for different quantity flow rates of the ingredients.

A further object of the invention is to provide a device of the class described in which air constitutes one of the fluids and the quantity flow rate thereof is arranged to control the quantity flow rate of the other fluid or fluids.

A still further object of the invention is to provide a device whereby the adjustably controlled quantity flow rate of the air alone determines and regulates the discharge rate of the product.

Yet another object of the invention is to provide a device of the class described in which further fluid flow therethrough automatically ceases by and upon a cessation of the operating suction.

The invention possesses other objects and features of advantage, some of which, with the foregoing, will be set forth in the following description of a preferred form of the invention, and in the accompanying drawings in which, Figure 1 is an elevation of apparatus embodying the invention.

Figure 2 is an elevation of the apparatus taken at right angles to that of Figure 1.

Figure 3 is an enlarged fragmentary sectional view taken on the line 3—3 in Figure 1, portions of the structure behind said line being broken away.

Figure 4 is an enlarged fragmentary sectional view taken generally on the line 4—4 in Figure 1.

Figure 5 is a sectional view taken on the line 5—5 in Figure 3.

Figure 6 is a perspective view showing the parts of an air valve of the device separated and in aligned relation, the valve body being shown in section.

Figure 7 is a face view of the air valve, portions of the structure being broken away.

The device of the present invention essentially comprises a fluid proportioning mechanism 11 for automatically effecting a desired proportioning of two or more fluids as they pass to a mixer 12 by reason of a suction in the intake passage for the mixer. The fluids to be mixed in the present case are fuel oil, water and air, and these fluids are introduced into the intake pipe 13 of the mixer in desired proportions from the proportioning mechanism in such a manner that the desired proportioning of the fluids is automatically maintained as the quantity flow from the mixer is varied. The mixed product constitutes a fuel and is arranged to be discharged under pressure through and from the mixer discharge pipe for combustion in a suitable combustion space or chamber (not shown). For effecting the production of the mixed fuel, it has been found that the mixer 12 may well constitute a pump of the rotary displacement type, since such a pump creates the necessary suction for feeding the fluids thereto, serves to thoroughly intermix the different ingredients therein, and creates the necessary discharge pressure for the product. A pump such as we have found particularly well adapted for use as a mixer is described in detail in our copending application for Letters Patent on a fuel compounding device, Serial No. 308,310, filed September 25, 1928.

The proportioning mechanism 11, it will now be noted, essentially comprises reservoirs 14 and 15 from which water and oil respectively are arranged to be delivered into the suction pipe 13. Float controlled valves 16 and 17 govern the flow of the water and oil to their respective reservoirs, and a novel valve 18 is provided for regulating the flow of air to the suction pipe 13. Delivery of the water and oil from the reservoirs 14 and 15 is arranged to take place through adjustable drip valves 19 and 21 respectively interposed between the reservoirs 14 and 15 and the pipe 13, said valves being so arranged and constituted that the quantity flow rate therethrough will vary with the suction obtaining in the pipe 13. For effecting the latter result, the liquids are arranged to be siphoned out of their respective reservoirs to the drip valves by reason of and in accordance with said suction and the permitted quantity air flow to and through the pipe 13. Preferably, and as shown, the valve 18 is arranged to discharge into the pipe 13 at a point therein between the pump and the points of discharge of the liquids into said pipe whereby the venturi effect of the air flow will be enhanced and the proper operation of the device will be further assured. It will thus be clear that an opening of the valve 18 to admit more air therethrough is arranged to decrease the suction at the discharge sides of the drip valves 19 and 21 for effecting a corresponding flow decrease therethrough whereby a desired proportioning of the oil and water in the fuel product may be automatically maintained while the fuel is being formed and discharged from the pump at different rates. The proportioning device 11, it is noted, constitutes a structural and operative unit and is suitable for use in proportioning other liquids and for other purposes than those set forth in the present application.

Referring now more particularly to the disclosed embodiment of the proportioning device 11, it will be noted that the pipe 13 is connected to the body of a manifold 22, is arranged to be vertically disposed, and is provided with a tapered bore 23 having its smallest diameter at the lower and discharge end thereof and connecting at its upper end with a vertical passage 24 of the manifold. Though the suction pipe 13 is particularly disclosed as being threadedly and removably engaged with the manifold 22, it will be noted that the pipe and manifold assembly might readily be formed as a single member. Extending radially from the central manifold portion is a plurality of similar and generally L-shaped extensions 25. Passages 26 extend through each of the extensions 25, each of said passages having a radially directed portion 27 preferably sloping slightly downwardly toward and to a connection with the vertical passage 24 of the manifold. Preferably, and as shown, the passage portions 27 terminate at points of the passage 24 which are symmetrically related to the axis of said last passage; in the present case, in which but two of the extensions 25 are found, the passage portions 27 enter the passage 24 at diametrically opposed sides thereof.

Generally vertical and parallel passage portions 28 and 29 (Figure 4) are provided in the outer and upwardly directed portions of each manifold extension 25, said passage portions being connected at their upper ends by a passage portion 31 extending between them and sloping upwardly from the passage portion 29 to provide a distinct edge 32 at the lower side of its juncture with the passage portion 28. The lower end of the passage portion 28 is connected to the outer end of the passage portion 27, while the passage portion 29 terminates at an outer face 33 of the extension. It will now be noted that the passage portions 29 and 31 provide a riser passage through which a liquid is to be drawn upwardly from a reservoir 14 or 15 by suction until it spills over the edge 32 into the passage portion 28. Preferably, and as shown, the passage portion 29 extends above the mouth of the passage portion 31 to define an air pocket above a stream through the passages, and a stopping of suction in the passage 28 is thus arranged to effect a breakage of the said stream at the edge 32.

The drip valves 19 and 21 are provided in the passage portions 28, which latter are here shown (Figs. 4 and 5) formed as cylindrical bores extending downwardly into the extensions from the top thereof and having a smaller bore portion adjacent their points of connection with the passage portion 27 to provide seats 35. Interposed across the larger part of each passage portion 28 and at or below the outlet of the passage portion 31 is a member 36 having a drip port 37 extending axially therethrough, said port being of smaller section than the outlet from the passage 28 whereby a solid column of liquid may not form in the passage 28 below the member 36. Preferably, and as particularly shown, the outlet of the drip port 37 is above the level of liquid in the associated reservoir, whereby any siphoning effect when the operating suction ceases is back toward the reservoir. The space of the passage 28 above the member 36 will seldom be filled with liquid, thereby providing another break in a possible siphoning stream. The duct thus provided by the passage portions 29, 31 and 28, it is noted, is such as to prevent the formation of a self-operating siphoning column of liquid therein for effecting a fluid flow from the reservoir when suction ceases in the passage portion 26, and the flow of liquid over the edge 32 is thus arranged to be controlled solely by the operating suction in said passage portion 26. A section of glass tubing 38 is engaged between the member 36 and the seat 35 in sealed relation therewith. In the present embodiment, the tubing section is arranged to be clamped between the member and seat by reason of the threaded engagement of the member in the passage bore. Threadedly engaged in a member 39 closing the upper end of the bore providing the passage portion 28 is a valve needle 41, the lower and inner end of said needle being cooperative with the inlet end of the port 37 of the member 36 to adjustably control the passage of liquid therethrough in a well understood manner. As shown, the member 39 is threadedly engaged in the bore, and a lock nut 42 is provided on the needle 41 for fixing the same in adjusted position. A portion of the metal opposite the glass tube 38 is cut away to provide a sight opening 43 for viewing the liquid as it drops from the needle valve port. It will be noted that the structures provided for the different extensions of the manifold are generally alike, differing only in the sizes of the drip valve ports 37. In the present instance the quantity oil flow from the reservoir 15 will be about three times that of water from the reservoir 14, and the area of the port 37 for delivering oil is accordingly made about three times that of the port 37 for delivering water, allowance for the difference in the viscosities of oil and water also being made. This relationship of the ports 37 permits a finer adjustment to a given oil-water ratio, but does not otherwise affect the operation of the device.

The reservoirs 14 and 15 are generally similar and are mounted by welding or otherwise on the different manifold extensions at the faces 33 thereof and with the bottoms of their cavities 34 continuous with the passage portions 29. Similar floats 44 are disposed in each of the reservoir cavities 34 and the cavities are vented to the atmosphere at the top thereof. The floats 44 are arranged to maintain the liquids in their cavities at fixed levels, said levels being below the levels of the V-edges 32 of the discharge siphons hereinbefore described. The inlet valves 16 and 17 for the reservoirs 14 and 15 respectively are mounted in the bottoms of the reservoirs and are arranged to be closed when the liquid levels in the reservoirs are proper. Control of the valves 16 and 17 is arranged to be effected by means of the engagement of the floats with valve stems 46 and 47 extending upwardly into the respective valves, a lowering of the liquid level in a reservoir being arranged to effect an opening of its inlet valve to admit liquid for maintaining the desired level thereof. Preferably, and as shown, a vertically adjustable contact member 48 is provided on each float for engagement with the cooperating valve stem, whereby to effect an adjustment of the normal level of the liquid in a reservoir with respect to the V-edge 32 of the associated siphon, such adjustment being necessary in a primary setting up of the mechanism or a change in the liquid to be passed therethrough.

Referring now more specifically to the structure of the valves 16 and 17, it will be noted that the water inlet valve 16 (Figure 5) may be conveniently constructed generally as is a valve of a pneumatic tire in which a seal is provided by the engagement of a fixed metal annulus with a seat provided on a valve disc 49 carried on the stem 46, the seat being of a resilient material such as rubber and the stem being urged to a valve closing position by a spring 50. Obviously, a seat of rubber would not be satisfactory with a valve for oil, and the oil inlet valve 17 is accordingly of somewhat different design. As shown, (Fig. 4), the valve stem 47 of the valve 17 carries a metallic valve disc 51 presenting a plane bearing surface for engagement with an annular seat 52 provided on a member 53 arranged for threaded engagement in the bore of the valve body, the cooperating disc and seat surfaces being ground together. Preferably, and as for the drip valves, the effective passage provided for the oil should have about three times the cross-sectional area of that for the water, under equal pressure conditions therefor.

It will now be noted that whenever a suction exists in the manifold of sufficient strength to draw liquid from the reservoirs and over the edges 32 in the manifold passages 26, the liquids from the reservoirs will be drawn over into the pump suction pipe 13 and so into the pump for mixing, and that these liquids will be delivered in quantities determined by the degree of suction and in proportions determined by the fixed settings of their needle valves. The control of the suction is arranged to be effected entirely through the appropriate adjustment of the air valve 18, and this valve is accordingly constructed in such manner as to permit the desired control. As shown in Fig. 6, the valve 18 comprises a hollow body 54 having a lower portion 55 arranged for threaded engagement with the top portion of the bore of the manifold passage 24. A tapered nozzle-like body portion 56 extends from and below the portion 55 whereby, when the body is mounted on the manifold, the portion 56 extends well below the discharge openings of the passages 26 and in spaced relation therefrom. A discharge passage extends from the valve body cavity axially through the portion 56 whereby said portion constitutes, in effect, an ejector nozzle with respect to the passages 26, since the increased flow of air therefrom tends to increase the suction in the passages 26 and so prevents a relief of the suction in said passages other than through the induced flow of liquid therethrough.

Means are provided for controllably varying the velocity flow of air which is admitted to the cavity of the valve 18. Accordingly, and as shown, (Figures 3, 6 and 7), the valve body 54 is formed with a side wall portion 57 thereof having a plane central outer face portion 58 defined within a protruding circular rim 59. The wall 57 is provided with a central bore 60 for the reception of a knob stem 61 carrying a disc 62 for engagement over and against the face 58 of the side wall portion 57, said disc being fixed to the stem which is also arranged to carry an operating knob 63 at the outer end thereof. A plate 64 is mounted on the rim 59, said plate cooperating with the face 58 to retain the disc 62 against the face 58 for rotation about its axis. An arcuate slot 66 and a row of perforations 67 are provided in opposed portions of the wall 57 and disc 62, respectively, the latter thus constituting a shutter for the slot 66. The plate 64 is perforated opposite the slot 66 as at 59' to permit a free movement of air thereto when perforations 67 register therewith.

Preferably, the front face of the plate 64 is provided with an arcuate row of markings 69 and other indicia for gauging a setting of the shutter. As shown, the markings 69 comprise a series of depressions in which a projection 71 at the back of an index hand 72 mounted on the knob stem is arranged to engage. The index hand 72 is preferably arranged to resiliently bear against the plate 64 whereby the shutter may be retained in set position. A pin 70 extends from the back of the disc 62 into the slot 66 from a point of the disc adjacent an end of its row of perforations 67 whereby the movement of the disc is confined between limiting positions for a full closure and opening of the passage provided by the slot.

In the use of a positive acting pump of the class provided, it is desirable that some air be admitted thereto at all times, and a constantly open inlet port is accordingly provided to the cavity of the valve 18. As shown, the port comprises a plurality of passages 73 provided in a plug 74 threadedly engaged through the wall of the valve cavity at a point thereof opposite the shutter structure. To prevent a deliberate or accidental closing of the passages 73, the plug 74 is preferably provided at its outer end with a stem 75 carrying a transverse disc 76 lying opposite and adjacent the inlet ends of the passages 73 to permit a free movement of air to said passages and at the same time hinder the application of a finger or other object thereto for covering them up. As shown, the stem 75 and disc 76 are integral with the plug. It will now be noted that the port provided by the passages 73 is preferably such that the suction created in the liquid passages 26 of the manifold when the shuttered opening of the air valve 18 is fully open will deliver minimum quantities of the different liquids from their reservoirs over the edges 32, adjustment for such relation being finally made by setting the valve operating members 48 on the floats. In this manner, the quantity flow of the liquids is arranged to be controlled entirely by the degree of opening of the shutter device of the air valve, the opening of the latter producing a liquid flow varying inversely with the degree of opening. It will be noted that the necessary operating suction of the proportioning device now described is at all times relatively low, and that the maximum range in the suction values for drawing the liquids into the suction pipe 13 is so little that the quantity flow of air into the air valve varies but little for said range.

It will now be clear that the proportioning device of our invention functions as a unit and may be adapted for the proportioning of any number of liquids with air or solely with each other, it being clear that in the latter case the suction would be created through a branch of the pipe 13. It is noted that in the present instance, the proportion of air in the final mixture is such as will alone fully support the combustion of the oil in the presence of the water at least at the lower rates of fuel consumption, the product for combustion comprising oil coated drops of water carried in suspension by the air.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative, and that such changes may be made, when desired, as fall within the scope of the appended claims.

Having thus described our invention, we claim as new and desire to secure by Letters Patent of the United States the following:

1. In a fluid proportioning device, a manifold, a reservoir for a liquid, and means providing a closed passage from the liquid in said reservoir to said manifold, said passage having riser and gravity discharge portions with the riser portion extending above the liquid level in said reservoir and with the discharge portion contracted to provide a drip orifice therein.

2. In a fluid proportioning device, a manifold, a reservoir for a liquid, means operative to maintain the liquid in said reservoir at a substantially fixed level, means providing a passage from the liquid in said reservoir to said manifold, said passage including riser and gravity discharge portions with the riser portion of the passage extending above said liquid level in the reservoir, and adjustable drip valve means operative in the gravity discharge portion of said passage and above said liquid level in the reservoir.

3. In a fluid proportioning device, a manifold, reservoirs for liquids, means providing siphoning passages from the reservoirs to the manifold, and valve means operative in the gravity discharge sides of said passages for adjustably varying the effective sizes of the passages provided therethrough, said valve means operative above the levels of the liquid in the respective reservoirs.

In testimony whereof, we affix our signatures.

WILBUR TEALE.
HERBERT F. McLAUTHLIN.